United States Patent [19]

Horst

[11] Patent Number: 5,677,586

[45] Date of Patent: Oct. 14, 1997

[54] COMMUTATION OF A UNIVERSAL MOTOR OPERATING IN BRAKE MODE

[75] Inventor: Gary E. Horst, St. Louis County, Mo.

[73] Assignee: Emerson Electric Co., St. Louis, Mo.

[21] Appl. No.: 296,027

[22] Filed: Aug. 25, 1994

[51] Int. Cl.⁶ .................................................. H02K 11/00
[52] U.S. Cl. .......................... 310/103; 310/68 A; 310/93; 310/184; 388/932
[58] Field of Search ........................... 310/103, 68 R, 310/68 A, 77, 76, 93, 109, 110, 134, 142, 149, 184; 318/375; 388/937, 932; 81/469, 57.11

[56] References Cited

U.S. PATENT DOCUMENTS

| 4,435,664 | 3/1984 | Boesel | 310/186 |
|---|---|---|---|
| 4,451,752 | 5/1984 | Tahara et al. | 310/186 |
| 4,743,815 | 5/1988 | Gee et al. | 318/254 |
| 4,891,562 | 1/1990 | Nuckolls et al. | 315/277 |
| 4,912,378 | 3/1990 | Vukosvic | 318/254 |
| 4,967,464 | 11/1990 | Stephens | 29/596 |
| 5,063,319 | 11/1991 | Mason et al. | 310/210 |
| 5,099,184 | 3/1992 | Hornung et al. | 318/375 |
| 5,294,874 | 3/1994 | Hessenberger et al. | 318/759 |
| 5,444,318 | 8/1995 | Stumpf | 310/77 |

Primary Examiner—Thomas M. Dougherty
Assistant Examiner—Jonathan Link
Attorney, Agent, or Firm—Polster, Lieder, Woodruff & Lucchesi

[57] ABSTRACT

A universal motor (18) for a power tool (10) has a stator assembly (22) and an armature (24). The stator assembly includes a plurality of interconnected field windings (28–34) to which current is supplied to run the motor. The armature has a commutator (36) including brushes (40a, 40b) for circulating current through the armature. To quickly and safely brake the motor, without excessively damaging the brushes, a switch (16) is interposed between an AC power source for the motor and the armature. In one embodiment, the switch shorts the armature during braking. In this embodiment, the switch includes sets (56, 58, 60) of electrical contacts by which the inner field windings (28, 30) are connected in series with the outer filed windings (32, 34); and the field windings are series connected with the armature. When the motor is braked, the switch is moved to a position opening the electrical connection between the power source and the outer field winding, while maintaining the electrical connection with the inner field windings. The switch includes electrical contacts across which the armature is connected when the motor is braked. The armature is shorted across these electrical contacts to help brake the motor.

14 Claims, 8 Drawing Sheets

RUNNING

BRAKING

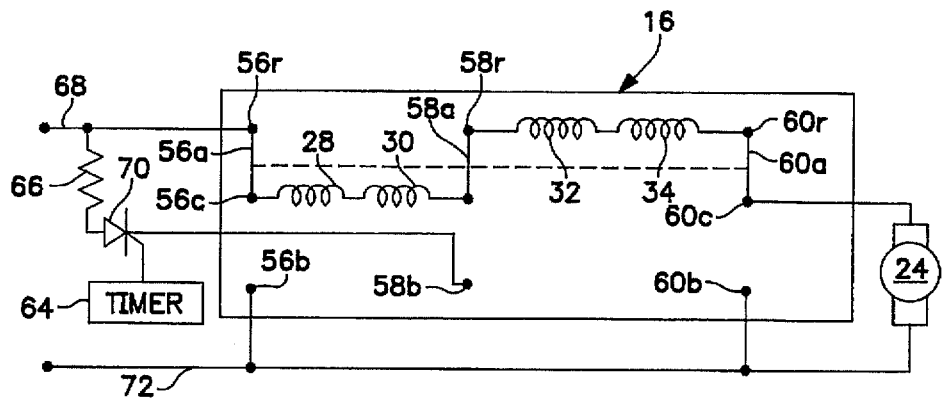
FIG. 4A
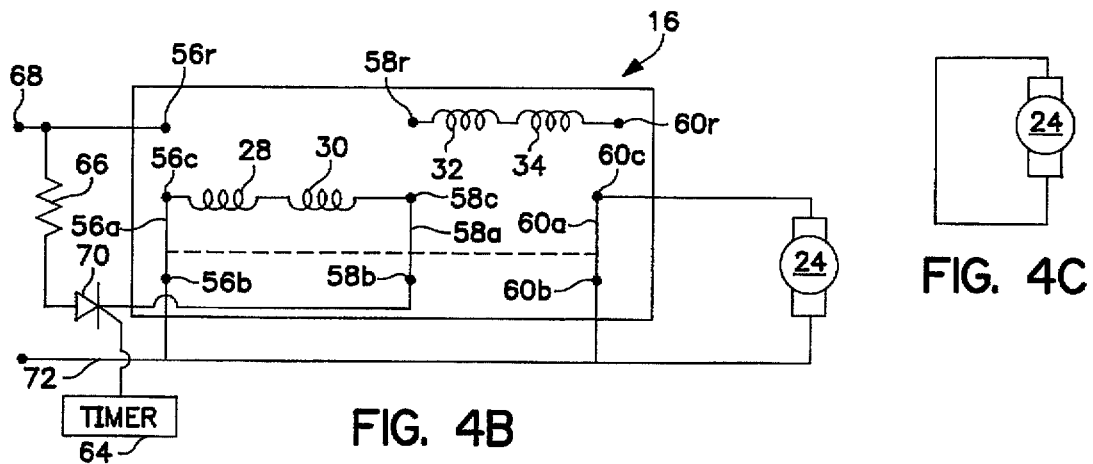
FIG. 4B
FIG. 4C
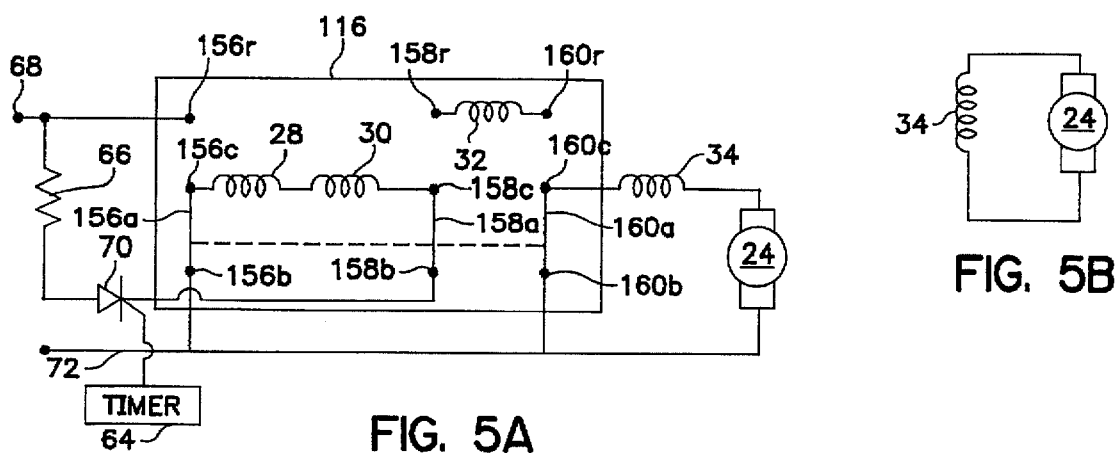
FIG. 5A
FIG. 5B

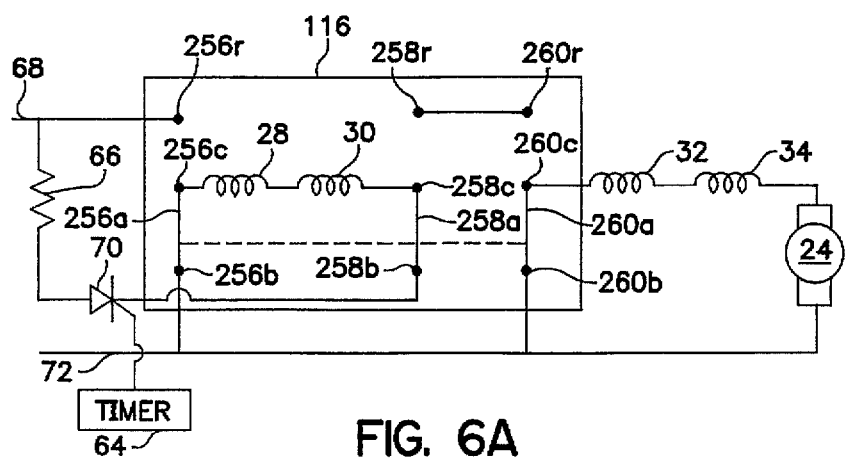
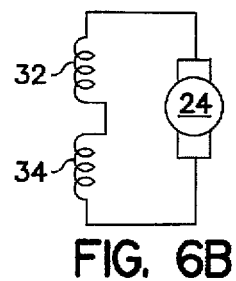
FIG. 6A
FIG. 6B
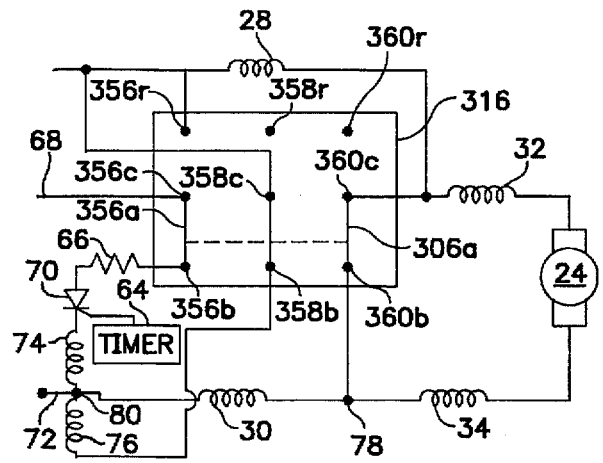
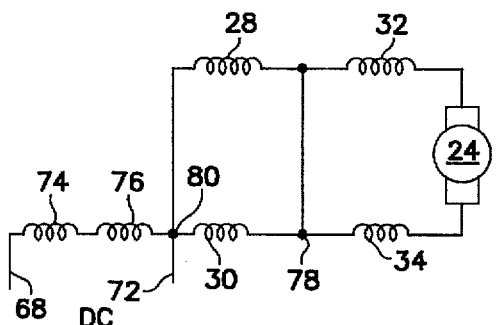
FIG. 7A
FIG. 7B
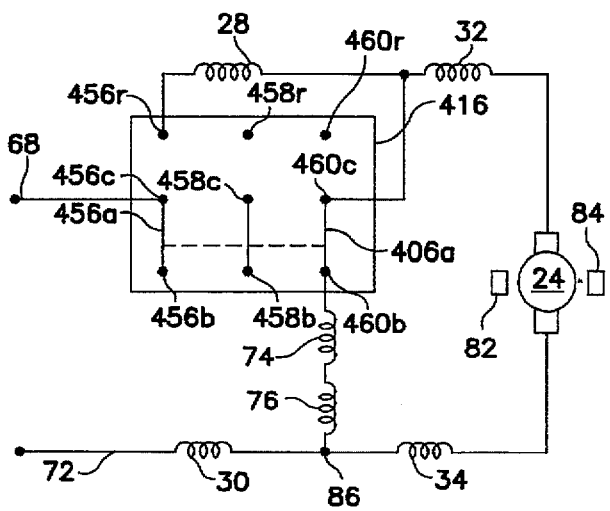
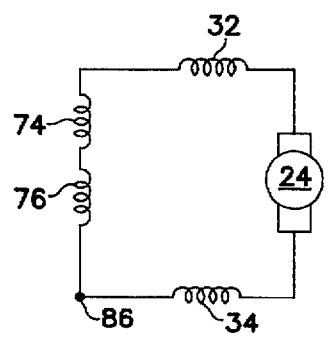
FIG. 7C
FIG. 7D

COMMUTATION OF A UNIVERSAL MOTOR OPERATING IN BRAKE MODE

BACKGROUND OF THE INVENTION

This invention relates to dynamoelectric machines such as universal motors and, more particularly, to improved commutation in such a motor when it is operated in a braking mode.

Universal motors are typically series-wound or compensated series-wound motors. The motors can be operated with either d.c. voltage or single phase a.c. voltage. They are also usually fractional horsepower motors; and as such, are used in a wide variety of applications. One common application is in the shop tool area where, for example, the motor is used in radial saws. Hand held radial saws are used with different blades for cross-cutting wood, ripping wood, etc. One feature now generally incorporated in radial saws having universal motors is electrical braking of the motor to quickly and safely bring the motor, and the attached blade, to a stop. It is especially desirable to stop the motor as quickly as possible when braking occurs; that is, when the user releases the start/stop switch by which he controls the saw. While safety considerations are paramount, one drawback in motor braking is the severe commutation problems which are created, and which quickly wear out the motor's brushes. It is a desirable goal in motor design and operation, therefore, to be able to continue to provide rapid braking, but to do so in such a way as to prolong brush life.

There are four main considerations in approaches to solving this problem. These are:

1) braking time;
2) motor commutation during braking;
3) consistent braking over time;
4) cost.

One approach that has been attempted has been to short out the bars of a commutator using stator windings excited with a d.c. current and voltage. This approach has the advantage of providing very fast braking because the armature of the universal motor is essentially converted into a series of short-circuited coils. These, in turn, resist a change in motor flux as the armature rotates. While rapid braking is achieved, the mechanical or electrical means of shorting the commutator bars has been found to be too expensive to make this approach practical.

It will be understood that each of these approaches involves certain tradeoffs with respect to the operational and cost criteria set out above. It has been found that of the above approaches, control of braking time has the best potential for achieving rapid braking in a manner that prolongs brush life, and to do so in an economical manner.

SUMMARY OF THE INVENTION

Among the several objects of the present invention may be noted the provision of a commutation circuit for use in universal motors; the provision of such a circuit which is particularly useful in the braking mode of motor operation; the provision of such a circuit by which the motor can be quickly braked to a complete stop while not imposing an undue strain on the motor's commutator brushes so as to prolong brush life; the provision of such a circuit to employ a switching strategy by which the motor's stator coils are switched in and out of a stator/armature circuit as the motor is switched between running and braking conditions of operation; the provision of such a circuit by which various configurations of inner and outer coils of the motor stator winding are implementable to effect motor braking; the provision of such a circuit to also use auxiliary coils which are switched into motor winding circuits only during motor braking; the provision of such circuit for use in shop equipment such as hand-held radial saws to quickly stop rotation of a saw blade when the user releases a switch controlling the saw's operation; the provision of such a circuit which is installable in existing saws, fitting within the case of the saw without the case requiring modification; the provision of such a circuit which is low in cost and easily implemented with current motor designs; the provision of such a circuit which can brake the motor to a complete stop in less than 2 (two) seconds; and, the provision of a method of braking a universal motor in such a manner as to extend brush lift of the motor's commutator.

In accordance with the invention, generally stated, a universal motor for a power tool has a stator assembly and an armature. The stator assembly includes a plurality of interconnected field windings to which current is supplied to run the motor. The armature has a commutator including brushes for circulating current through the armature. To quickly and safely brake the motor, without excessively damaging the brushes, a switch is interposed between an AC power source for the motor and the armature. In one embodiment, the switch shorts the armature during braking. In this embodiment, the switch includes sets of electrical contacts by which the inner field windings and outer field windings are connected in a series, with the field windings being series connected with the armature. When the motor is braked, the switch is moved to a position opening the electrical connection between the power source and the outer field windings, while maintaining the electrical connection between the power source and inner field windings. The switch also includes electrical contacts across which the armature is connected when the motor is braked. The armature is electrically shorted across these contacts to help brake the motor. Alternate embodiments for motor braking are also disclosed as is a method of quickly and safely braking the motor. Further, alternate approaches to braking control are described. Other objects and features will be in part apparent and in part pointed out hereinafter.

BRIEF DESCRIPTION OF THE DRAWINGS

FIG. 4A is a schematic of the motor for a first switching arrangement of the motor's stator coils for effecting motor braking, the switching arrangement being shown in a motor running position;

FIG. 4B is a schematic of the motor for a first switching arrangement of the motor's stator coils for effecting motor braking, the switching arrangement being shown in a motor running position;

FIG. 4C is a simplified circuit diagram for the motor with the switched stator coil connections of FIG. 4B;

FIG. 5A is a schematic of the motor for a second switching arrangement of the motor's stator coils for effecting motor braking;

FIG. 5B is a simplified circuit diagram for the motor with the stator coil connections of FIG. 5A;

FIG. 6A is a schematic of the motor for a third switching arrangement of the motor's stator coils for effecting motor braking using auxiliary windings;

FIG. 6B is a simplified circuit diagram for the motor with the stator coil connections of FIG. 6A;

FIG. 7A is a schematic of the motor for a fourth switching arrangement of the motor's stator coils for effecting motor braking using auxiliary windings;

FIG. 7B is a simplified circuit diagram for the motor with the stator coil connections of FIG. 7A;

FIG. 7C is a schematic of the motor for an alternate switching arrangement of the motor's stator coils and auxiliary coils;

FIG. 7D is a simplified circuit diagram for the motor with the stator coil connections of FIG. 7C;

Corresponding reference characters indicate corresponding parts throughout the several views of the drawings.

DESCRIPTION OF THE PREFERRED EMBODIMENTS

Figure 1:
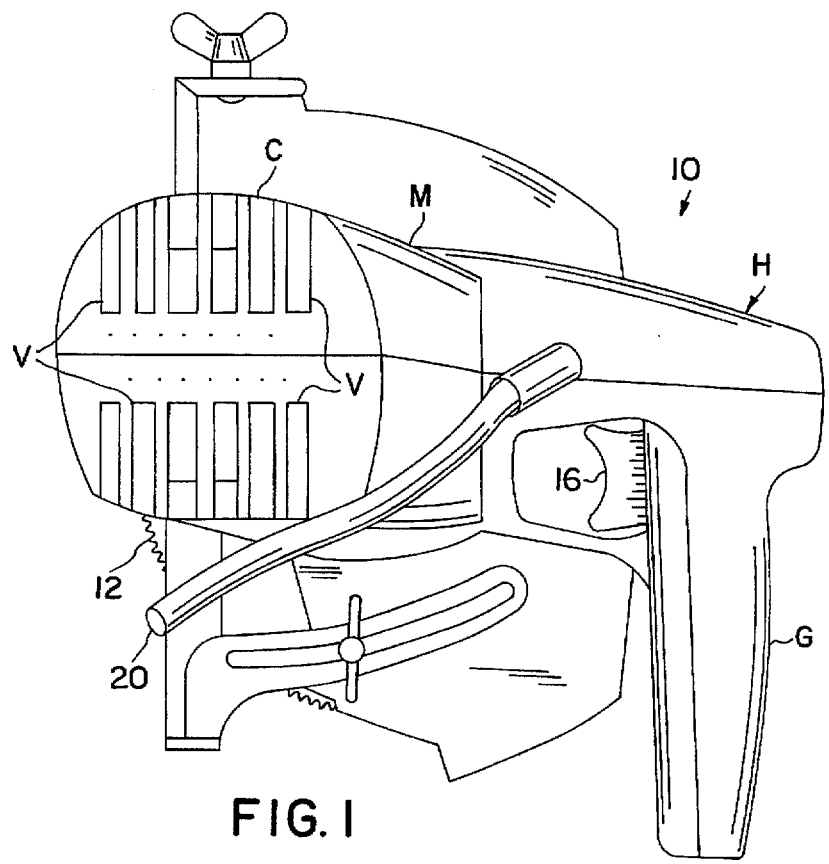
FIG. 1 is a representation of a hand-held circular saw employing a universal motor whose operation is braked when a user of the saw releases an activation switch.

Referring to the drawings, a shop tool indicated generally 10 in FIG. 1 comprises a hand-held radial saw. The saw includes a circular saw blade 12 mounted to a shaft 14 (see FIG. 2A) for rotation when a user engages a switch 16. The saw employs a universal motor 18 (see FIG. 2A) which is activated when switch 16 is engaged. Depressing switch 16 connects the motor to AC power delivered to the motor through a power cord 20 whose one end plugs into a convenient electrical outlet (not shown). Shaft 14 is a drive Shaft of the motor. While the circuitry of the present invention is described for use with a shop tool such as saw 10, it will be understood that the invention is applicable to universal motors used in other applications as well. As is well-known in the art, the various components are mounted in a housing H which is typically a hard plastic housing. As shown in FIG. 1, motor 18 is mounted in a housing section M which extends outwardly to one side of the main portion of the housing. The outer end of this housing section has vents V for cooling the motor during saw operation. A hand grip G is formed as part of the housing and allows the user to readily grasp the tool and guide it while cuts are being made.

Figure 2A:
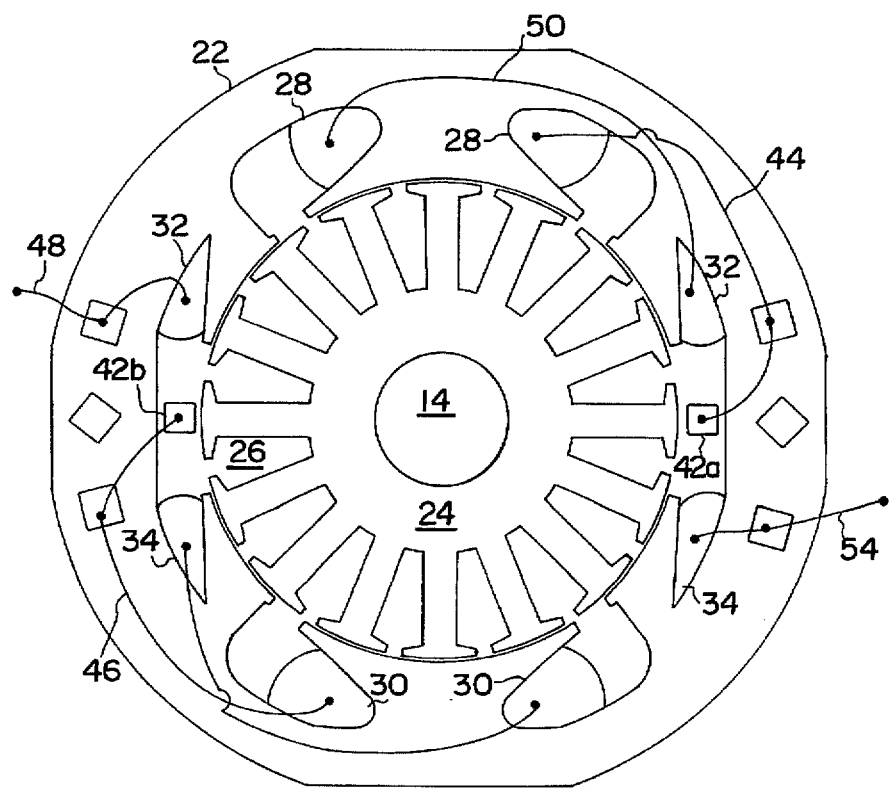
FIG. 2A is a sectional view of a prior art universal motor illustrating the stator and rotor assemblies of the motor.
Figure 2B:
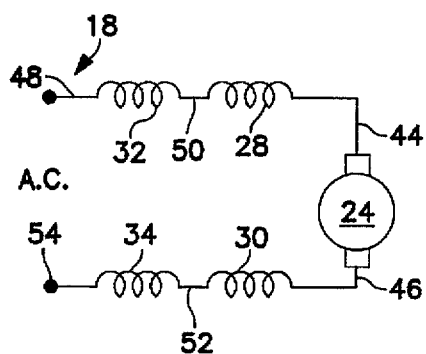
FIG. 2B is a wiring diagram for the motor; and, FIG. 2C illustrates a commutator portion of the motor.
Figure 2C:
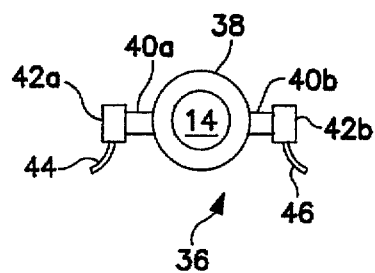

As seen in FIG. 2A, motor 18 has a stator assembly 22, and a rotor assembly or armature 24 disposed for rotation in a central bore 26 of the stator assembly. The armature rotates about shaft 14. In FIG. 2B, the stator assembly is shown to include a plurality of coils. There are four such coils shown in FIG. 2B, two of these coils, coils 28 and 30 being referred to as inner coils. The other two coils, coils 32 and 34, are referred to as the outer coils. Though not shown in the drawings, there are also two armature coils. Shown in FIG. 2C is a commutator 36 of the motor. The commutator includes a ring 38 mounted on shaft 14. Ends of the armature windings are connected to this ring. In addition, the commutator includes a pair of brushes 40a, 40b which are mounted in respective brush holders 42a, 42b. Electrical leads 44, 46 are attached to the brushes. Referring again to FIGS. 2A and 2B, an electrical lead 48 from switch 16 is connected to one end of outer coil 32. The other end of coil 32 is connected to one side of inner coil 28 by an electrical wire 50. The other end of coil 28 connects to brush 40a of commutator 36 through lead 44. On the other side of the armature, lead 46 extends from brush 40b to one side of the other inner coil 30. From the other side of coil 30, a lead 52 connects to one side of the other outer coil 34. Finally, a lead 54 connects from the other side of coil 34 back to switch 16.

A paramount concern in tools such as hand-held radial saws is bringing the blade to a complete stop quickly and safely when switch 16 is released. In radial saws using universal motors such as motor 18, this is done by electrically braking the motor. One drawback in braking motor 18 this way is that severe arcing is imposed on the motor's commutator, and the result of this arcing is to quickly wear out the motor's brushes 40a, 40b. The circuitry of the present invention and the method described hereinafter provide rapid braking of the motor so necessary for peoples' saftey, but do so in such a way as to prolong brush life. Because shop tools such as saw 10 are expensive items, prolonging the useful life of the brushes reduces the expense of repairing or replacing the tool.

Figure 3A:
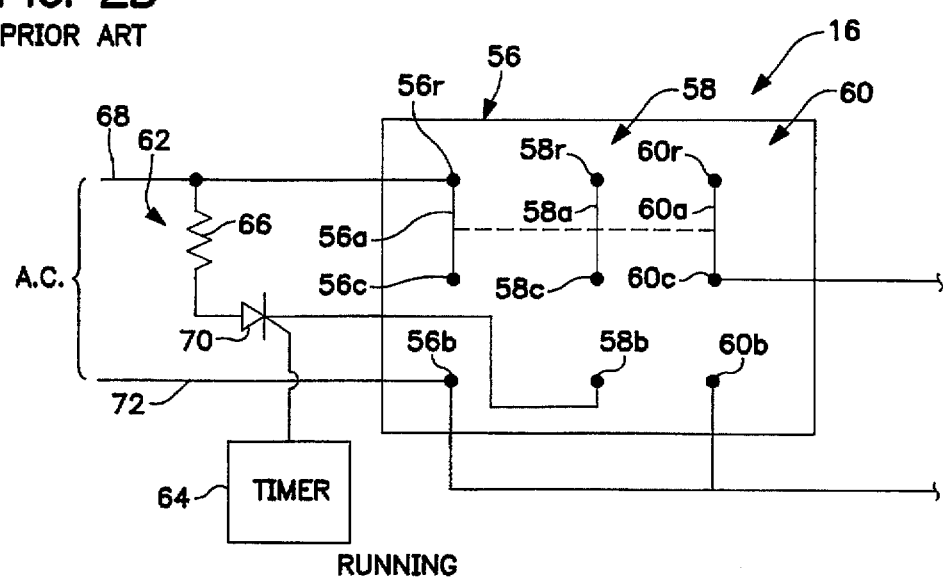
FIG. 3A is a partial schematic diagram of circuitry of the present invention illustrating switch connection when a universal motor is in its "running" mode of operation.
Figure 3B:
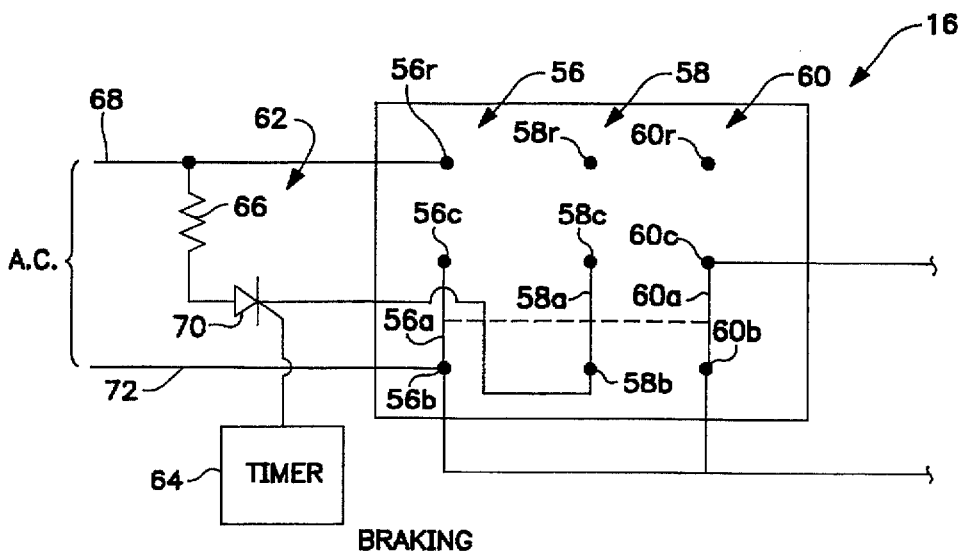
FIG. 3B is a partial schematic diagram of the circuitry illustrating switch connections for the motor with the motor is in its "braking" mode of operation.

Referring now to FIGS. 3A and 3B, switch 16 is shown to include a three pole-double throw switch (3PDT) having a first or motor running position (FIG. 3A), and a second or motor braking position (FIG. 3B). Switch 16 has three sets of contacts indicated 56, 58, 60 respectively. Each set of contacts includes three contacts; a center contact c, a motor running contact r, and a motor braking contact b. The switch further includes a switch arm a for each set of contacts. Each switch arm has one end connected to the center contact c of the contact set. The other end of the switch arm is movable between the running and braking contacts of the set. The switch arms are ganged together (as indicated by the dashed lines), so to move in unison between the respective running or braking contacts of each set. For safety purposes, switch 16 may be a "Dead Man's" switch. That is, the switch must be held in the motor running position by the user depressing the switch. The switch contact arms are spring loaded so if the pressure on the switch is released, the spring drives the ganged switch arms to the motor braking position.

While switch 16 is interposed between a source of AC power and the motor field windings and armature, the invention further includes a means 62 for converting the AC power to DC power. Means 62 includes timing means 64 for supplying the DC power to motor windings for a predetermined interval after motor braking commences. Means 62 includes a resistor 66 connected between one of the AC input power lines 68, and the anode of a silicon controlled rectifier (SCR) 70. In the embodiments described hereinafter, resistor 66 is a 4–5.5 ohm resistor which is used to reduce the current through the SCR. The cathode of the SCR is connected to one of the switch contacts. The gate of the SCR is connected to timing means 64. The timing means comprises a timer circuit (which may be any of a plurality of timing circuits well-known in the art) which controls the gate input to the SCR. When switch 16 is switched to the motor braking position, the SCR is gated for an interval determined by the timing circuit. During this period, rectified AC is supplied to the switch contact connected to the cathode of the SCR, so a DC input is supplied to the windings.

Referring to FIGS. 4A and 4B, one way of effectively braking motor is to short the armature of the motor. A switch arrangement for doing so includes the 3PDT switch 16 as previously described. In the Figs., the inner field windings 28, 30 are shown connected in series with each other. Further, the windings are connected between switch contacts 56c and 58c (the center contacts of the respective sets of contacts). The outer field windings 32, 34 are also connected in series. These windings are connected between contacts 58r and 60r of switch. 16. One AC power line 68 is connected to switch contact 56r. The other AC power line 72 is connected to both switch contacts 56b and 60b and to one side of armature 24. The other side of the armature connects to switch contact 60c.

In FIG. 4A, switch 16 is in the motor running position. This is the position of the switch when the user of the saw depresses the switch. In this switch configuration, during one half-cycle of current frequency, AC power is routed to contact 56r, and through switch arm 56a to center contact 56c of the set 56 of contacts. Current then flows from center contact 56c to center contact 58c through the series connected inner field windings 28, 30. Next, current flows through switch arm 58a to switch contact 58r. From contact 58r, current flows through the series connected outer field windings 32, 34 to contact 60r. Armature 24 is now connected to the windings through switch arm 60a and contact 60c, flow through the armature then being back to AC line 72. In the other half-cycle of AC, the flow path is reversed.

In FIG. 4B, switch 16 has been switched to its motor braking position. This condition arises when the user releases the switch. Now, the current path from AC line 68 is open at contact 56r. However, there is a DC path from line 68 through resistor 66 and SCR 70 to switch contact 58b. From here, the circuit path is through the switch arm 58a to center contact 58c. Inner field windings 28, 30 are series connected between contact 58c and contact 56c, 56C. Now, contact 56c is connected to AC line 72 through switch arm 56a and contact 56b. As noted, DC power is supplied during the interval established by timing means 64 controlling the gate input of the SCR, so DC current is supplied to windings 28, 30 during this interval. In addition, outer field windings 32, 34 are dropped from the circuit through armature 24. When switch 16 is switched to its braking position, these windings are open circuited. Finally, armature 24 is short circuited by the switching. The short circuit path is through switch contacts 60b and 60c, and switch arm 60a. FIG. 4C represents the effect of positioning switch 16 in the motor braking position.

Figure 9:
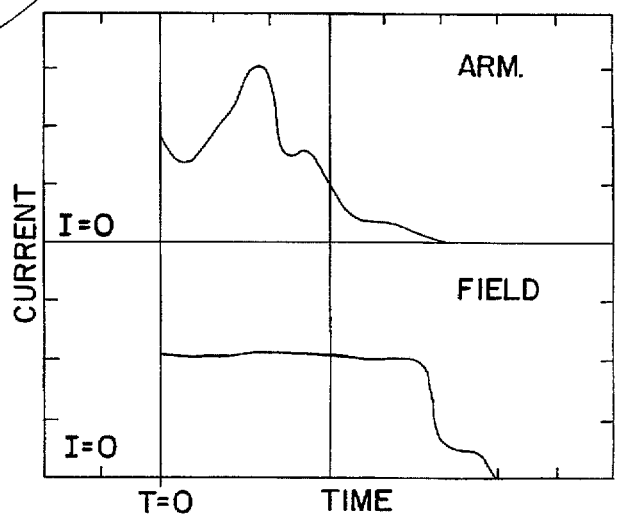
FIGS. 9–12 are respective current profiles for the stator and armature windings of the motor when configured in accordance with the schematics of FIGS. 4B, 5A, 6A, and 7A; and, FIGS. 13–15 are respective flux plots for the motor's stator and armature when the motor is configured in accordance with the schematics of FIGS. 4B, 5A, and 6A.
Figure 13:
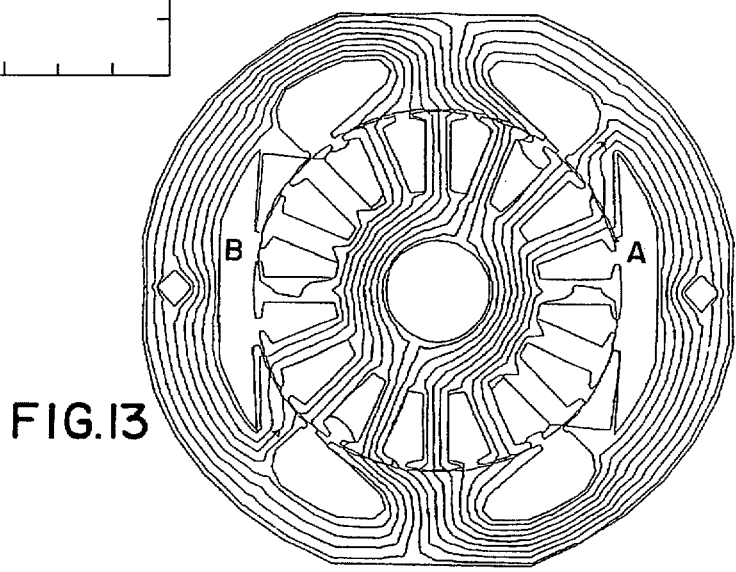
Figure 16:
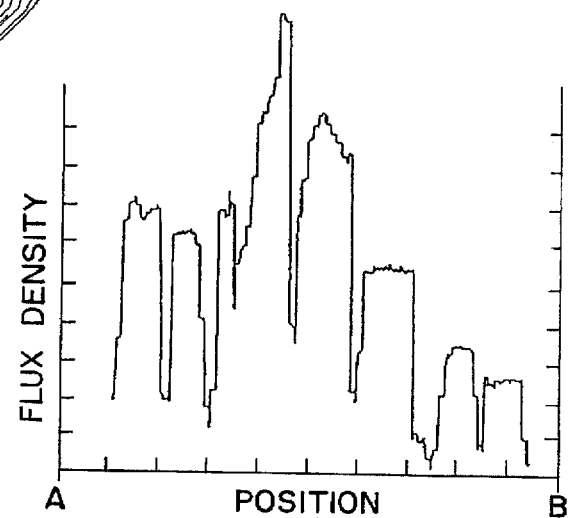
FIGS. 16–18 are respective flux density plots for the motor's stator and armature when the motor is configured in accordance with the schematics of FIGS. 4B, 5A, and 6A; and, FIG. 19 illustrates another alternate embodiment to braking control using auxiliary coils on the motor's field coils.

Referring to FIG. 9, a current vs. time plot is presented for both the armature and the field windings. In the upper plot, it will be seen that at a time T=0, corresponding to the time switch 16 is moved to its motor braking position, the armature current shows an initial decrease followed by a rapid increase to a peak value of approximately 40 amps. From this peak, the current rapidly decays to zero. The elapsed time is approximately 1.75 seconds. In the lower portion of the plot, the current through the field windings is shown to be constant at about 36 amps for an interval approximating that during which the armature current goes to zero. Then the field winding current falls rapidly to zero. The constant current level represents the DC current supplied to inner field windings 28, 30 through SCR 70. Next, referring to FIG. 13, a flux density plot of the motor's stator and armature are shown. A flux density graph of the motor is shown in FIG. 16. The graph of FIG. 16 is across armature 24 and is taken between the points A and B marked in FIG. 13.

Referring now to FIGS. 5A and 5B, a second embodiment of the invention includes another way of braking motor 18 by shorting the armature. A switch 116 is again a 3PDT switch. In FIG. 5A, the inner field windings 28, 30 are shown connected in series with each other. The windings are connected between switch contacts 156c and 158c. The outer field windings 32, 34 are now not connected in series in the same manner as in FIGS. 4A and 4B. Rather, winding 32 is connected between contacts 158r and 160r of switch 116. AC power line 68 is connected to switch contact 156r, and AC power line 72 is connected to both switch contacts 156b and 160b, and to one side of armature 24. The other side of the armature connects to switch contact 160c through the now series connected outer field winding 34.

When switch 116 is in the motor running position, AC power is routed to contact 156r, and through switch arm 156a to center contact 156c. Current flows from center contact 156c to center contact 158c through inner field windings 28, 30. Current flow is then through switch arm 158a to switch contact 158r. From contact 158r, current flows through outer field winding 32 to contact 160r, and from contact 160r through winding 34 to armature 24.

In FIG. 5A, switch 116 is shown switched to its motor braking position. As with the embodiment of FIG. 4B, the current path from AC line 68 is open at contact 156r. There is again a DC path from line 68 through resistor 66 and SCR 70 to a switch contact 158b, through switch arm 158a to contact 158c, through field windings 28, 30 to contact 156c, to AC line 72 through switch arm 156a and contact 156b. Again as above, DC power is supplied to windings 28, 30 during the interval established by timing means 64. In addition, outer field windings 32 is dropped from the circuit through armature 24. Armature 24 is again short circuited by the switching, the short circuit path being through switch contacts 160b and 160c, and switch arm 160a. However, this short circuit path now includes outer field winding 34. This is as shown in FIG. 5B.

Figure 10:
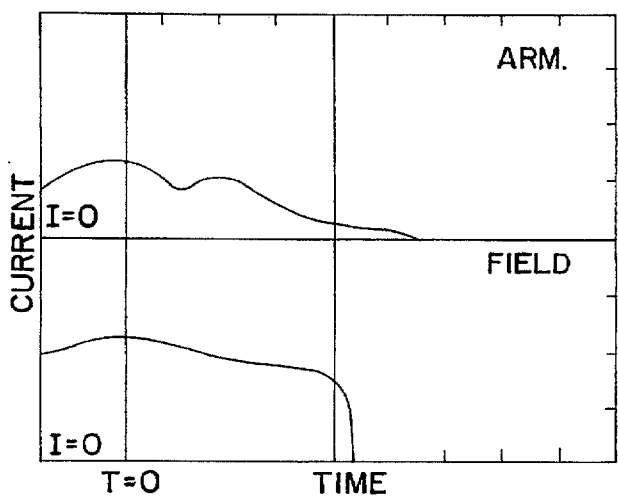
Figure 14:
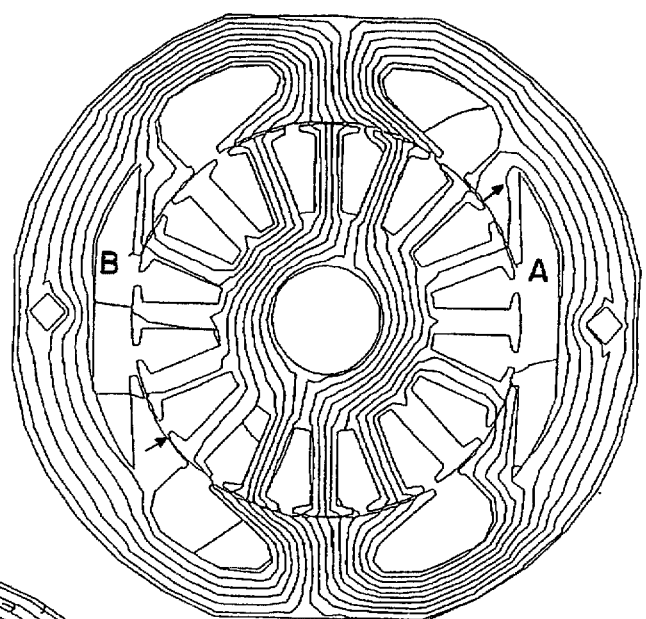
Figure 17:
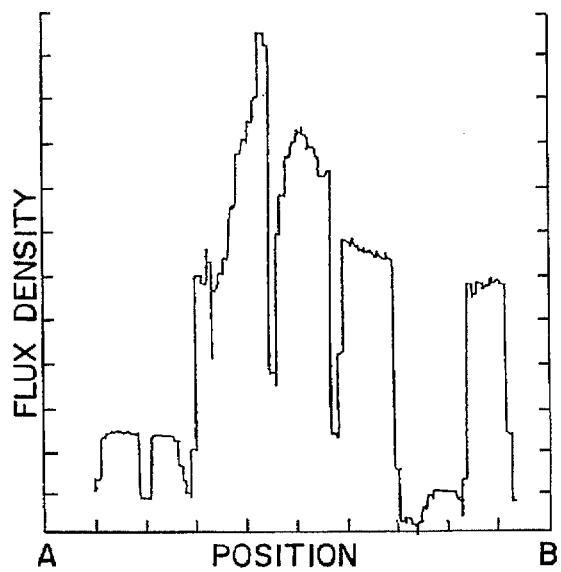

Referring to FIG. 10, a current vs. time plot is presented for both the armature and the field windings of the embodiment of FIGS. 5A and 5B. As before, time T=0 is when switch 116 is moved to its motor braking position. Now, the armature current shows a gradual increase to a peak value of approximately 30 amps. From this peak, the current decays to zero, this decay being somewhat more gradual than in the previous embodiment. The elapsed time is now approximately 2.25 seconds which is about one-half second longer than in the previous embodiment. In the lower portion of the plot, the current through the field windings is shown to be constant at about 36 amps for the interval approximating that during which the armature current goes to zero. This corresponds to the winding current level in the previous embodiment. As before, the constant current level represents the DC current supplied to inner field windings 28, 30 through SCR 70. Next, referring to FIG. 14, a flux density plot of the motor's stator and armature are shown. A flux density graph of the motor is shown in FIG. 17. In the graph of FIG. 17, the points are taken across armature 24 between the points A and B marked in FIG. 14. It will be noted that the flux density as shown in these representations is somewhat higher than that shown in the previous embodiments.

Referring to FIGS. 6A and 6B, a third embodiment of the invention for braking motor 18 by shorting the armature is shown. A switch 216 is a 3PDT switch, as before. In FIG. 6A, inner field windings 28, 30 are shown connected in series with each other, and connected between switch contacts 256c and 258c. The outer field windings 32, 34 are now connected in series with motor armature 24, the windings being connected between one side of the armature and switch contact 260c. Now contacts 258r and 260r of switch 216 are shorted together. AC power line 68 is connected to switch contact 256r, and AC power line 72 is connected to both switch contacts 256b and 260b, and to the other side of armature 24.

When switch 216 is in the motor running position, AC power is routed to contact 256r, through switch arm 256a, to center contact 256c. Current flows from center contact 256c to center contact 258c through inner field windings 28, 30. Current flow is then through switch arm 258a to switch contact 258r. Since contact 258r is shorted to contact 260r from contact 258c to contact 260c and then through outer field windings 32 and 34 to armature 24.

In FIG. 6A, switch 216 is shown in its motor braking position. Again, the current path from AC line 68 is open at contact 256r. The DC path is again from line 68 through resistor 66 and SCR 70 to a switch contact 258b, through switch arm 258a to contact 258c, through the inner field windings to contact 156c, and to AC line 72 through switch arm 256a and contact 256b. DC power is supplied to windings 28, 30 during the interval established by timing means 64. Armature 24 is again short circuited by the switching, the short circuit path being through switch contacts 260b and 260c, and switch arm 260a. This short circuit path now includes both outer field windings 32 and 34. This is shown in FIG. 6B.

Figure 11:
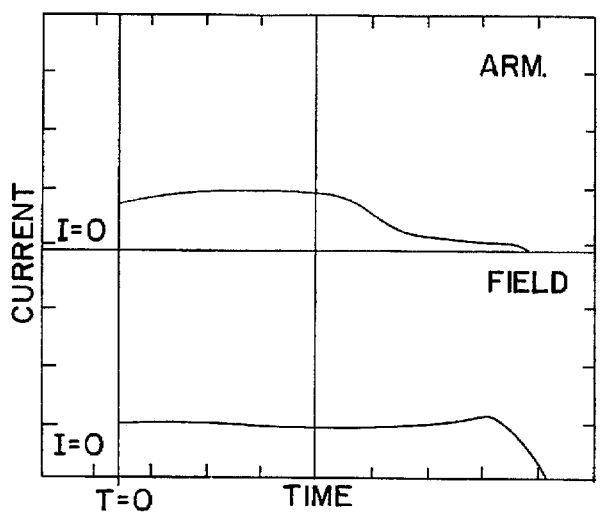
Figure 15:
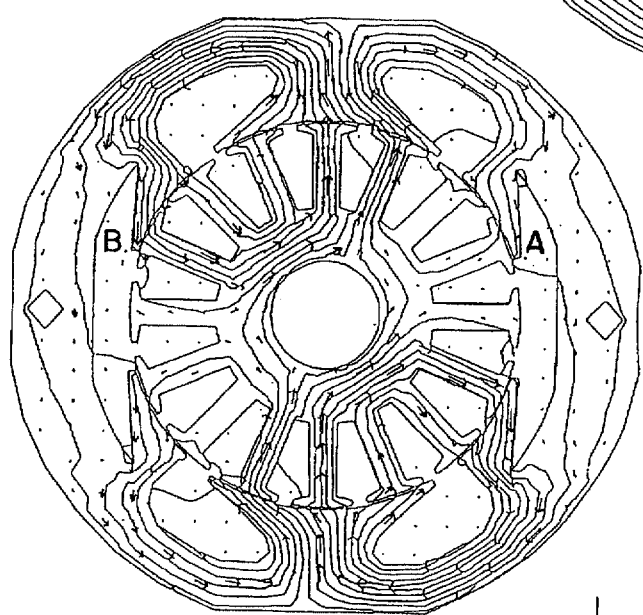
Figure 18:
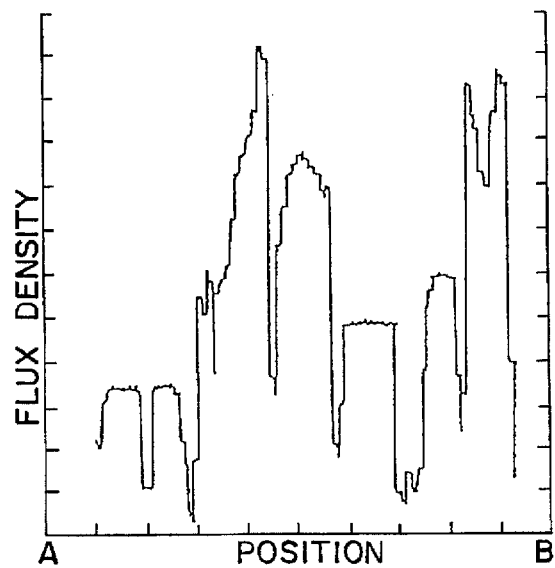

Referring now to FIG. 11, a current vs. time plot is presented for both the armature and the field windings of the embodiment of FIGS. 6A and 6B. As before, time T=0 occurs when switch 216 is moved to its motor braking position. Now, the armature current shows a generally steady current amplitude of approximately 30 amps. From this level, the current decays to zero, this decay again being somewhat more gradual than that in the embodiment of FIGS. 4A–4C. The elapsed time is now approximately 2.50 seconds which is the longer than in the previous embodiments. In the lower portion of the plot, the current through the field windings is again shown to be constant at about 36 amps for the interval approximating that during which the armature current goes to zero. This corresponds to the winding current level in the previous embodiment. As before, the constant current level represents the DC current supplied to inner field windings 28, 30 through SCR 70. Referring to FIG. 15, a flux density plot of the motor's stator and armature are shown. A flux density graph of the motor is shown in FIG. 18. In the graph of FIG. 18, the points are again taken across armature 24 between the points A and B marked in FIG. 15. It will be noted that the flux density as shown in these representations are again somewhat higher than that shown in the previous embodiments.

Figure 8:
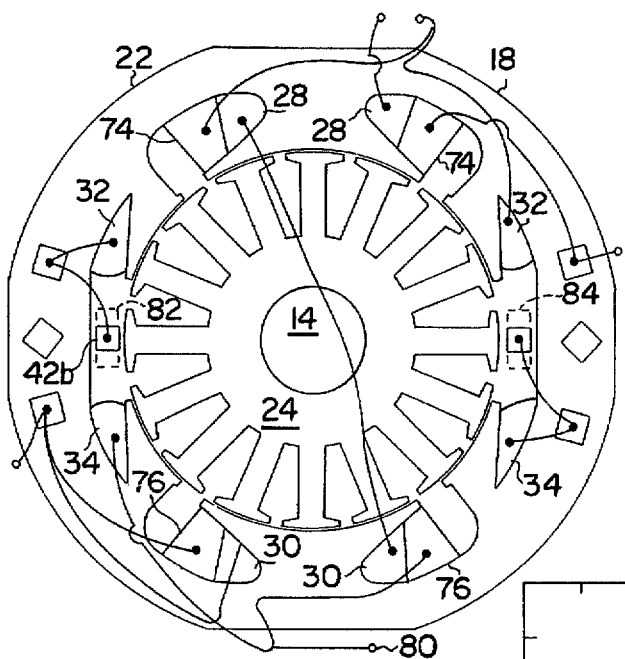
FIG. 8 is a sectional view of a universal motor illustrating the stator and rotor assemblies of the motor configured in accordance with the wiring diagram of FIG. 7A and including auxiliary stator coils.

Referring to FIGS. 7A and 7B, another embodiment of the invention for braking motor 18 is shown. In this embodiment, auxiliary field windings 74, 76 are used in addition to the inner and outer field windings of the stator. Now, a 3PDT switch 316 is used to switch the auxiliary windings into the armature circuit during motor braking. In FIG. 7A, the inner field windings 28, 30 are no longer connected in series with each other. Instead, winding 28 is connected between switch contacts 356r and 358c, on one side of the winding; the other side of the winding being connected to contact 360c. Winding 30 is connected between switch contact 360b and AC line 72. AC line 68 is connected to switch contact 356c. Outer field winding 32 is also connected to contact 360c and to one side of armature 24. The other outer field winding 34 is now connected to the other side of armature 24, and to a common point 78 with one end of winding 30. Common point 78 is connected to contact 360b. Resistor 66 connects between switch contact 356b and SCR 70. The cathode of the SCR connects to a common point 80 through the series connected auxiliary windings 74, 76. Common point 80 connects to AC line 72 and to switch contact 358b. FIG. 8 illustrates the physical arrangement of the auxiliary windings 74, 76 in stator assembly 22.

Figure 12:
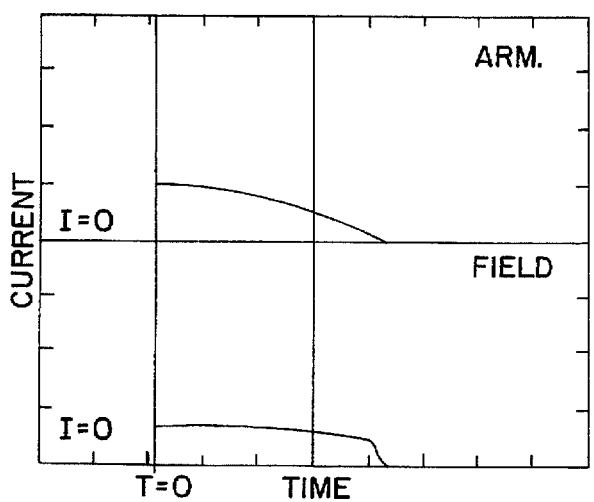

When switch 316 is in the motor running position, AC power is routed to contact 356r, through switch arm 356a and center contact 356c. Current flows from contact 356r through winding 28 to center contact 360c. From there, current flow is through outer field winding 32, armature 24, and series connected windings 34, 30 to AC line 72. In FIG. 7A, switch 316 is shown in its motor braking position. Here, the current path from AC line 68 is now connected to resistor 66 and SCR 70 via contact 356c, switch arm 356a, and contact 356b. As a result, DC power is supplied to auxiliary windings 74, 76. One side of winding 28 is connected to common point 80 through contact 358b, switch arm 358a, and contact 358c. The other side of winding 28 is still serially connected to outer field winding 32 and the armature. On the other side of the armature, winding 34 is now connected in parallel with winding 30. This is because common point 78 is now short circuited to switch contact 360c through contact 360b and switch arm 360a. The resulting circuit configuration is shown in FIG. 7B. With the auxiliary windings, the braking time of the motor is approximately 3 seconds. This is a longer interval than for those embodiments previously described. In FIG. 12, the current profile for the embodiment of FIGS. 7A, 7B is shown. Here, the armature current is shown is decrease gradually from an initial peak value. Again, the field winding current is generally constant throughout the interval during which DC current is supplied to the windings.

When switch 416 is in the motor running position, AC power is routed to contact 456r through switch arm 456a and center contact 456c. Current now flows from contact 456r through windings 28 and 32 to armature 24. On the other side of the armature, current flow is through outer field winding 34 and series connected inner field winding 30 to AC line 72. In FIG. 7C, switch 416 is shown in its motor braking position. In this configuration, armature 24 is short circuited through a path which includes outer field windings 32, 34 which are serially connected with auxiliary windings 74, 76. One side of winding 74 is now connected to winding 32 through contact 460b, switch arm 460a, and contact 460c. One wide of winding 76 is connected to the outer field winding 34 at a common point 86. The resulting circuit configuration is shown in FIG. 7D. Again, the braking time for the motor is approximately 3 seconds. The current profile for this embodiment is similar to that shown in FIG. 12.

As can be seen from the foregoing, it is possible to have a fast braking interval by connecting the field windings in various combinations using a 3PDT switch. The braking interval ranges from 1.75 seconds to 3.0 seconds depending upon the configuration used. With respect to the impact on brush wear, visual observation of the motor's commutator, when motor commenced, is as follows:

a) for the configuration of FIG. 4B, a very severe burst of blue light was observed, ⅜" streamers were also observed;

b) for the configuration of FIG. 5A, a heavy burst of blue light was observed, as were ¼" streamers;

c) for the configuration of FIG. 6A, a slight burst of blue was observed, as were ⅛" streamers.

It is common to rank commutation operation on a scale of 1–10 with 1 being the best operation and 10 the worst. Based on the observations noted above, the embodiment of FIG. 4B is ranked an 8, that of FIG. 5B, a 5, and that of FIG. 6B, a 3.

Figure 19:
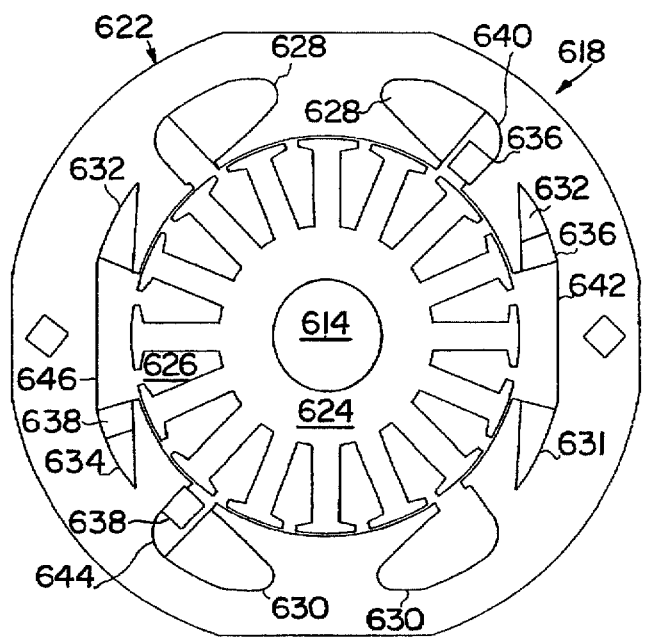

Finally, referring to FIG. 19, a motor 618 has a stator assembly 622, and an armature 624 disposed for rotation in a central bore 626 of the stator assembly. The armature rotates about a shaft 614. The stator assembly includes inner field windings 628, 630, and outer field windings 632, 634. Now, rather than interpole magnets, motor 618 includes auxiliary coils 636, 638 which are used as side poles. That is, they are used to impart an interpole action to help commutation. Coil 636 is installed in stator slots 640, 642 so to fit about one portion of coil 632. Similarly, winding 638 is installed in stator slots 644, 646 to fit about coil 634. Current is supplied to these side coils during braking to, as noted, impart an interpole flux to the armature.

What has been described is a commutation circuit for use in universal motors; and, in particular, for use in commutating the motor. The circuit is useful during the braking mode of motor operation. Implementation of the circuit in the motor allows the motor to be quickly braked to a complete stop, while not imposing an undue strain on the motor's commutator brushes. This prolongs brush life. The circuit employs a switch and switching strategy by which the motor's stator coils are switched in and out of a stator/armature circuit as the motor is switched between running and braking conditions. Using the circuit various configurations of inner and outer coils of the motor stator windings are implemented to produce motor braking. And, auxiliary coils can also be used, the auxiliary coils being switched into motor winding circuits during braking. The circuit is used in shop equipment such as hand-held radial saws to quickly stop rotation of a saw blade when a user releases a switch controlling the saw's operation. The circuit can be installed in existing saws, and fits within the saw's case without requiring modification to the case. The circuit is low in cost and readily implemented in existing motor designs. Use of the circuit can brake the motor to a complete stop in under two (2) seconds.

Finally, a method of braking a universal motor in such a manner as to extend brush life of the motor's commutator has been described.

In view of the foregoing, it will be seen that the several objects of the invention are achieved and other advantageous results are obtained.

As various changes could be made in the above constructions without departing from the scope of invention, it is intended that all the matter contained in the above description or shown in the accompanying drawings shall be interpreted as illustrative and not in a limiting sense.

Having thus described the invention, what is claimed and desired to be secured by Letters Patent is:

1. In a universal motor having a stator assembly and an armature, the stator assembly having a central bore in which the armature is positioned for rotational movement relative to the stator assembly, and a plurality of interconnected field windings to which current is supplied to run the motor, the field windings including two inner field windings and two outer field windings, the armature including a commutator for circulating current through the armature and one outer field winding being series connected with the armature, the commutator including brushes contacting the armature for routing electrical current through the armature, the improvement comprising means for braking the motor to stop its rotation, said braking means including switch means interposed between an AC power source for the motor and the armature for switching electrical connections between the field windings to effect a braking action of the motor without causing an excessive commutator brush wear thereby to quickly and safely brake the motor without damaging the brushes, the switch means including a switch for changing the electrical interconnections between the respective windings when the motor is to be braked, the switch including sets of electrical contacts by which the inner field windings are series connected to the other outer field winding, and the inner field windings and other outer field winding are connected in series with the one outer field winding and the armature when the switch is in a motor running position, and the switch position, when the motor is braked, opening and electrical connection between a source of power to the inner field windings and said other outer field winding, and the switch including an additional set of electrical contacts across which the armature and the series connected one outer field winding are connected when the motor is braked, said additional set of electrical contacts shorting the armature and said one outer field winding thereby to stop the motor.

2. The improvement of claim 1 wherein the switch includes sets of electrical contacts with the respective field windings being connected to the switch so, when the switch is in its motor running position, the outer field windings and inner field windings are series connected with the armature; and, when the motor is braked, the switch is moved to a position which opens the electrical connection between a source of power and the outer field windings, while simultaneously maintaining the electrical connection between the source of power and the inner field windings, and the switch including an additional set of electrical contacts across which the armature is connected when the motor is braked, the armature being short circuited across said additional set of electrical contacts thereby to stop the motor.

3. The improvement of claim 2 further including means for converting AC power from the power source to DC, and timing means for supplying DC power to the field windings for a predetermined interval after motor braking commences.

4. The improvement of claim 3 wherein the converting means includes a semiconductor switching device and the timing means includes a timer controlling gating of the switching device.

5. The improvement of claim 1 wherein the outer field windings are series connected with the armature and the switch includes sets of electrical contacts, one contact of one set of contacts being shorted to a contact of another set of contracts by which the inner field windings are series connected to the outer field windings and the armature when the switch is in a motor running position, and the switch position, when the motor is braked, opening the electrical connection between a source of power and the outer field windings, and the switch including an additional set of electrical contacts across which the armature and the outer field windings are connected in series when the motor is braked, said additional set of electrical contacts shorting the armature and outer field windings thereby to stop the motor.

6. The improvement of claim 5 wherein the outer field windings are series connected with the armature and the inner field windings are series connected with the outer field windings when the motor is running, and the switch includes sets of electrical contacts by which said inner field windings are connected in parallel with the outer field windings during motor braking, and the auxiliary windings are connected in parallel with the inner field windings.

7. A power tool having a movable component comprising:

a universal motor having a stator assembly and an armature, the stator assembly having a central bore in which the armature is positioned for rotational movement relative to the stator assembly and a plurality of interconnected field windings including two inner field windings and two outer field windings to which current is supplied to run the motor, and the armature including a shaft one which the armature is mounted for rotation, the component being connected to one end of the shaft, and a commutator for circulating current through the armature and including brushes contacting the armature for routing electrical current through the armature;

means for braking the motor to stop its rotation, said braking means including switch means interposed between an AC power source for the motor and the armature for switching electrical connections between the field windings to effect a braking action of the motor without causing an excessive wear of the commutator thereby to quickly and safely brake the motor without damaging the commutator's brushes, the switch means including a switch for changing the electrical interconnections between the respective windings when the motor is to be braked, the switch having sets of electrical contacts with the respective field windings being connected to the switch so, when the switch is in a motor running position the outer field windings and inner field windings are series connected with the armature; and, when the motor is braked, the switch is moved to a position which opens the electrical connection between a source of power and the outer field windings, while simultaneously maintaining the electrical connection between the source of power and the inner field windings, and the switch including an additional set of electrical contacts across which the armature is connected when the motor is braked, the armature being short circuited across said additional set of electrical contacts thereby to stop the motor, one outer field winding being series connected with the armature and the switch contacts series connecting the inner field windings with the outer field winding, the inner field windings and other outer field winding being series connected with the one outer field winding and the armature when the switch is in a motor running position, and the switch position, when the motor is braked, opening the electrical connection between the power source and the inner field windings and said other outer field winding, and the switch further including a set of electrical contacts across which the armature and the series connected one outer field winding are connected when the motor is braked to short the armature and said one outer field winding thereby to stop the motor; and, means for converting AC power from the power source to DC, and timing means for supplying DC power to the field windings for a predetermined interval after motor braking commences.

8. The power tool of claim 7 further including auxiliary windings for facilitating braking of the motor.

9. A method for quickly and safely stopping a power tool having a moveable component attached to a rotatable shaft and a universal motor for rotating the shaft when the motor is running, the motor having a stator assembly and an armature, the armature being mounted on the shaft, to one end of which the component is attached, for rotational movement relative to the stator assembly, the stator assembly including a plurality of interconnected field windings to which current is supplied to run the motor the field windings including two inner field windings and two outer field windings; and the armature further including a commutator for circulating current through the armature and including brushes contacting the armature for routing electrical current through the armature, the method comprising:

interposing a switch means between an AC power source and the motor;

positioning the switch in a motor running position by a user of the tool for AC power to be routed to the field windings and armature of the motor, positioning the switch in the motor running position connecting the armature and the field windings in a first circuit path, positioning the switch to the motor braking position including switching the electrical interconnections between the respective inner field windings and outer field windings, wherein positioning the switch to the motor running position connects one outer field winding is series with the armature and connects the inner field windings in series with the other outer field winding for the inner field windings and the other outer field winding to be connected in series with the one outer field windings to be connected in series with the one outer field winding and the armature, and positioning the switch in the motor braking position opening the electrical connection between the source of power and the inner field windings and the other outer field winding, while shorting the armature and the one outer field winding;

positioning a switch in a motor braking position by the user to effect a braking action of the motor, positioning the switch in the motor braking position connecting the field windings and armature in a second circuit path in which the armature is short circuited, thereby to brake the motor causing an excessive wear of the commutator brushes;

converting AC power from the power source to DC power, and supplying the DC power to the field windings for a predetermined interval after motor braking commences.

10. The method of claim 9 wherein positioning the switch to the motor running position connects the outer field windings and inner field windings in series with the armature; and, positioning the switch to the motor braking position opens the electrical connection between a source of power and the outer field windings, while simultaneously maintaining the electrical connection between the source of power and the inner field windings, and short circuiting the armature.

11. A power tool having a movable component comprising:

a universal motor having a stator assembly and an armature, the stator assembly having a central bore in which the armature is positioned for rotational movement relative to the stator assembly and a plurality of interconnected field windings including two inner field windings and two outer field windings to which current is supplied to run the motor, and the armature including a shaft one which the armature is mounted for rotation, the component being connected to one end of the shaft, and a commutator for circulating current through the armature and including brushes contacting the armature for routing electrical current through the armature;

means for braking the motor to stop its rotation, said braking means including switch means interposed between an AC power source for the motor and the armature for switching electrical connections between the field windings to effect a braking action of the motor without causing an excessive wear of the commutator thereby to quickly and safely brake the motor without damaging the commutator's brushes, the switch means including a switch for changing the electrical interconnections between the respective windings when the motor is to be braked, the outer field windings being series connected with the armature and the switch including sets of electrical contacts, one contact of one set of contacts being shorted to a contact of another set of contacts by which the inner field windings are series connected to the outer field windings and the armature when the switch is in a motor running position, and the switch position, when the motor is braked, opening the electrical connection between a source of power and the outer field windings, and the switch including an additional set of electrical contacts across which the armature and the outer field windings are series connected when the motor is braked, said additional set of electrical contacts shorting the armature and outer field windings thereby to stop the motor; and, means for converting AC power from the power source to DC, and timing means for supplying DC power to the field windings for a predetermined interval after motor braking commences.

12. A power tool having a movable component comprising:

a universal motor having a stator assembly and an armature, the stator assembly having a central bore in which the armature is positioned for rotational movement relative to the stator assembly and a plurality of interconnected field windings including two inner field windings and two outer field windings to which current is supplied to run the motor, and the armature including a shaft one which the armature is mounted for rotation, the component being connected to one end of the shaft, and a commutator for circulating current through the armature and including brushes contacting the armature for routing electrical current through the armature;

means for braking the motor to stop its rotation, said braking means including switch means interposed between an AC power source for the motor and the armature for switching electrical connections between the field windings to effect a braking action of the motor without causing an excessive wear of the commutator thereby to quickly and safely brake the motor without damaging the commutator's brushes, the switch means including a switch for changing the electrical interconnections between the respective windings when the motor is to be braked, means for converting AC power from the power source to DC, and timing means for supplying DC power to the field windings for a predetermined interval after motor braking commences; and auxiliary windings for facilitating braking of the motor.

13. A method for quickly and safely stopping a power tool having a moveable component attached to a rotatable shaft and a universal motor for rotating the shaft when the motor is running, the motor having a stator assembly and an armature, the armature being mounted on the shaft, to one end of which the component is attached, for rotational movement relative to the stator assembly, the stator assembly including a plurality of interconnected field windings to which current is supplied to run the motor, the field windings including two inner field windings and two outer field windings; and the armature further including a commutator for circulating current through the armature and including brushes contacting the armature for routing electrical current through the armature, the method comprising:

interposing a switch means between an AC power source and the motor;

positioning the switch in a motor running position by a user of the tool for AC power to be routed to the field windings and armature of the motor, positioning the switch in the motor running position connecting the armature and the field windings in a first circuit path including switching the electrical interconnections between the respective inner field windings and outer field windings, positioning the switch to the motor running position connecting the inner field windings in series with the outer field windings and the armature, and positing the switch in its motor braking position shorting the armature and outer field windings thereby to stop the motor;

positioning a switch in a motor braking position by the user to effect a braking action of the motor, positioning the switch in the motor braking position connecting the field windings and armature in a second circuit path in which the armature is short circuited, thereby to brake the motor causing an excessive wear of the commutator brushes; and converting AC power from the power source to DC power, and supplying the DC power to the field windings for a predetermined interval after motor braking commences.

14. A method for quickly and safely stopping a power tool having a moveable component attached to a rotatable shaft and a universal motor for rotating the shaft when the motor is running, the motor having a stator assembly and an armature, the armature being mounted on the shaft, to one end of which the component is attached, for rotational movement relative to the stator assembly, the stator assembly including a plurality of interconnected field windings to which current is supplied to run the motor, the field windings including two inner field windings and two outer field windings; and the armature further including a commutator for circulating current through the armature and including brushes contacting the armature for routing electrical current through the armature, the method comprising:

interposing a switch means between an AC power source and the motor;

positioning the switch in a motor running position by a user of the tool for AC power to be routed to the field windings and armature of the motor, positioning the switch in the motor running position connecting the armature and the field windings in a first circuit path including switching the electrical interconnections between the respective inner field windings and outer field windings, the motor including auxiliary windings for facilitating braking of the motor, and positioning the switch in the motor running position connects the outer field windings in series with the armature and the inner field windings; and, positioning the switch to the motor braking position connects the inner field windings in parallel with the outer field windings and the armature, and connects the auxiliary windings in parallel with the inner field windings;

positioning a switch in a motor braking position by the user to effect a braking action of the motor, positioning the switch in the motor braking position connecting the field windings and armature in a second circuit path in which the armature is short circuited, thereby to brake the motor causing an excessive wear of the commutator brushes; and converting AC power from the power source to DC power, and supplying the DC power to the field windings for a predetermined interval after motor braking commences.

* * * * *